(12) United States Patent
Yoshida

(10) Patent No.: US 12,169,031 B2
(45) Date of Patent: Dec. 17, 2024

(54) ELECTRICALLY OPERATED VALVE

(71) Applicant: FUJIKOKI CORPORATION, Tokyo (JP)

(72) Inventor: Tatsuya Yoshida, Tokyo (JP)

(73) Assignee: FUJIKOKI CORPORATION, Tokyo (JP)

( * ) Notice: Subject to any disclaimer, the term of this patent is extended or adjusted under 35 U.S.C. 154(b) by 0 days.

(21) Appl. No.: 18/250,788

(22) PCT Filed: Sep. 7, 2022

(86) PCT No.: PCT/JP2022/033519
§ 371 (c)(1),
(2) Date: Apr. 27, 2023

(87) PCT Pub. No.: WO2023/084892
PCT Pub. Date: May 19, 2023

(65) Prior Publication Data
US 2024/0318739 A1  Sep. 26, 2024

(30) Foreign Application Priority Data

Nov. 10, 2021 (JP) ................................ 2021-183277

(51) Int. Cl.
*F16K 31/04* (2006.01)
*F16K 27/02* (2006.01)

(52) U.S. Cl.
CPC ............ *F16K 31/04* (2013.01); *F16K 27/029* (2013.01)

(58) Field of Classification Search
CPC .............................. F16K 31/04; F16K 27/029
See application file for complete search history.

(56) References Cited

U.S. PATENT DOCUMENTS 6,619,933 B2 *  9/2003  Ikeda .................... F04C 23/008
                                                              62/505
7,375,446 B2 *  5/2008  Suzuki ................. F16K 27/029
                                                              310/90

(Continued)

FOREIGN PATENT DOCUMENTS

| JP | 2014194169 A | 10/2014 |
| JP | 2021032295 A | 3/2021 |
| JP | 2021110409 A | 8/2021 |

OTHER PUBLICATIONS

International Search Report issued for PCT application No. PCT/JP2022/033519, dated Nov. 8, 2022.

*Primary Examiner* — Eric Keasel
(74) *Attorney, Agent, or Firm* — LUCAS & MERCANTI, LLP

(57) ABSTRACT

In an electrically operated valve including a valve main body having a valve chamber communicated with an inflow passage and an outflow passage for the refrigerant, a valve body changing a flow rate of the refrigerant by moving forward and backward between a valve close state and a valve open state, an electric motor driving the valve body, a control board mounting an electronic component controlling the electric motor thereon, a board storage portion storing the control board in a sealed state, an external portion connecting terminal electrically connecting to the external portion, and a connector portion sealed by supporting the external portion connecting terminal to the internal portion and fitting to a mating connector, a communicating passage communicating the board storage portion and the connector portion is provided, and the board storage portion comes to the sealed state when the mating connector is fitted to the connector portion.

9 Claims, 8 Drawing Sheets

(56) References Cited

U.S. PATENT DOCUMENTS

| | | | |
|---|---|---|---|
| 8,800,959 B2* | 8/2014 | Hasunuma | F16K 41/103 |
| | | | 251/129.04 |
| 9,719,509 B2* | 8/2017 | Yano | H01R 13/40 |
| 9,976,475 B2* | 5/2018 | Nowak | F16K 31/535 |
| 10,352,475 B2* | 7/2019 | Uehara | F16K 37/0041 |
| 11,906,604 B2* | 2/2024 | Oblak | G01R 33/02 |
| 2017/0074158 A1 | 3/2017 | Nowak et al. | |

* cited by examiner

ELECTRICALLY OPERATED VALVE

CROSS REFERENCE TO RELATED APPLICATION

This Application is a 371 of PCT/JP2022/033519 filed on Sep. 7, 2022 which, in turn, claimed the priority of Japanese Patent Application No. 2021-183277 filed on Nov. 10, 2021, both applications are incorporated herein by reference.

TECHNICAL FIELD

The present invention relates to an electrically operated valve, and more particularly to an electrically operated valve including a board storage portion which stores a control board of the electrically operated valve, and a connector which makes an electrical connection to an external portion.

BACKGROUND ART

An electrically operated valve controlling an opening degree of a valve with the use of an electric motor such as a stepping motor has been conventionally used for a refrigeration cycle apparatus which is provided with a refrigerant circuit such as an air conditioning machine and a refrigeration/freezing apparatus.

Further, as the electrically operated valve as described above, there is an electrically operated valve including a controller which supplies an exciting current to a coil and controls an electric motor. The controller is mounted to a printed board, and the board (refer to "control board" or simply to "board" in the present application) is stored in a board storage portion.

The board storage portion is constructed, for example, by a box-shaped case body which is formed by resin, and a lid body which occludes an opening of the case body, and is sealed by welding the lid body to the opening of the case body after storing the board in the case body. The sealing is provided for preventing a short circuit from being generated by infiltration of moisture and preventing a malfunction and a damage in an electronic component and a circuit from being generated.

Further, the following patent literature 1 exists as a publication disclosing the electrically operated valve as described above.

CITATION LIST

Patent Literature

Patent Literature 1: Japanese Unexamined Patent Publication No. 2021-110409

SUMMARY OF INVENTION

In the meantime, the electrically operated valve provided with the board as mentioned above has not conventionally had any method of previously inspecting a sealing performance of a board storage portion before shipping a product after sealing the storage portion and confirming whether or not the board storage portion is securely sealed.

However, if the board storage portion has any poor sealing, infiltration of moisture may cause a malfunction or a failure of the electrically operated valve. Therefore, it is desired to provide a technology of previously preventing these disadvantages.

Accordingly, an object of the present invention is to make it possible to inspect a sealing performance of a board storage portion in an electrically operated valve with a control board.

In order to solve the problem mentioned above and achieve the object, an electrically operated valve according to the present invention is provided with an electrically operated valve including a valve main body having a valve chamber which is communicated with an inflow passage introducing a refrigerant and an outflow passage discharging the refrigerant, a valve body which changes a flow rate of the refrigerant by moving forward and backward with respect to a valve seat formed within the valve chamber between a valve close state seating on the valve seat and a valve open state separating from the valve seat, an electric motor which drives the valve body, a control board on which an electronic component controlling the electric motor is mounted, a board storage portion which allows the control board to be stored in a sealed state, and a connector portion having an external portion connecting terminal which performs an electrical connection to the outside and a sealing structure which is sealed by fitting to a mating connector, wherein the electrically operated valve further includes a communicating passage which allows the board storage portion and the connector portion to be communicated, and the board storage portion comes to the sealed state when the mating connector is fitted to the connector portion.

The electrically operated valve according to the present invention has a structure in which both the connector portion and the board storage portion come to the sealed state (in particular, a watertight and airtight state preventing the water and the water vapor from infiltrating) when the mating connector is connected to the connector portion, and is provided with the communicating passage which communicates the connector portion with the board storage portion. Therefore, in a state in which the mating connector is not connected to the connector portion, the board storage portion is in a state in which the board storage portion is communicated with the outside via the connector portion.

On the contrary, when the mating connector is connected to the connector portion, the connector portion comes to the sealed state, and the board storage portion accordingly comes to the sealed state. The term "mating connector" means a connector having a specific shape which can be fitted and connected to the connector portion. In other words, the connector portion is generally manufactured in such a manner as to have a specific shape (fixed shape which is previously defined by a user differently) which is adapted to (conformed to) a user side of the electrically operated valve, and the connector portion comes to the sealed state by fitting the mating connector having the specific shape as mentioned above.

Therefore, in the electrically operated valve according to the present invention, it is possible to inspect a sealing performance (airtightness) by utilizing the connector portion and the newly provided communicating passage. More specifically, it is possible to inspect whether or not any poor sealing occurs by pressing gas (for example, air or inert gas) for inspecting in the board storage portion from the connector portion through the communicating passage so as to set the board storage portion to a fixed pressurizing state and monitoring change of the pressure. In other words, it is possible to find that no poor sealing occurs in the board storage portion (also in the connector portion) if the pressure is not lowered. On the contrary, if the pressure is lowered, it is possible to find that the poor sealing occurs.

The board storage portion may have a case portion having an opening which allows the control board to be stored in an internal portion thereof and allows the board to be installed in the internal portion thereof, and a lid body which occludes the opening.

In this aspect, an outer shell forming portion covering a stator of the electric motor may be further provided, and the outer shell forming portion and the case portion may be integrally formed.

Further, a coil coating forming portion covering a coil included in the stator may be disposed in an inner side of the outer shell forming portion. According to the aspect mentioned above, it is possible to prevent a winding wire of the coil from being damaged when forming and to avoid reduction of strength due to void generation in the outer shell forming portion having a complex shape, since the two-stages of forming step (that is, the double coating structure) is employed. More specifically, it is possible to simultaneously achieve the winding wire breakage prevention when forming and the strength securement of the forming portion by forming at a low pressure the coil coating forming portion covering the coil in which the breakage such as deformation, insulation failure and breaking of wire tends to be generated by the resin pressure application when forming and thereafter forming the outer shell forming portion covering the coil coating forming portion at a high pressure.

The outer shell forming portion is preferably formed by introducing resin from a gate (introducing port) at one position so as to prevent a weld line causing the reduction of strength. This is because of preventing a crack from being generated in the weld line due to the temperature change when using with age, thereby occurring the moisture infiltration. On the contrary, in a case where the double coating structure (structure provided with the coil coating forming portion in the inner side of the outer shell forming portion) as described above is employed, the coil coating forming portion is not necessarily taken into consideration too much its strength since the strength can be secured by being covered by the outer shell forming portion. Thus, the resin can be introduced from the gates at a plurality of positions and the coil having the complex shape can be more securely covered.

Further, a severe dimensional accuracy is required in the connector portion since the connector portion is necessarily fitted so as to come to the sealed state. However, the connector portion can be formed at the high pressure together with the outer shell forming portion by employing the double coating structure as described above even in a case where the outer shell forming portion and the connector portion are integrally formed. As a result, the dimensional accuracy of the connector portion can be improved.

According to a typical aspect of the present invention, the outer shell forming portion, the case portion and the connector portion are integrally formed. Further, in this aspect, the electrically operated valve may be provided with a terminal coating forming portion which is formed in an inner side of the connector portion, and covers and supports an intermediate portion of an external portion connecting terminal, and the communicating passage may be formed in the terminal coating forming portion.

Further, the aspect which is provided with the terminal coating forming portion is preferably structured such that one end portion of the terminal coating forming portion exposes (for example, protrudes) to an internal space of the connector portion, one opening of the communicating passage is formed in the one end portion, the other end portion of the terminal coating forming portion exposes (for example, protrudes) to an internal space of the case portion and the other opening of the communicating passage is formed in the other end portion. This is because of preventing the material (resin) forming the connector portion and the case portion from infiltrating into the communicating passage when forming the connector portion and the case portion, thereby closing the communicating passage.

Further, according to the other typical aspect of the present invention, the connector and the lid body are integrally formed as a lid body with connector portion, the electrically operated valve is provided with a terminal coating forming portion which is formed in an inner side of the lid body with connector portion, and covers and supports an intermediate portion of an external portion connecting terminal, and the communicating passage is formed in the terminal coating forming portion.

Further, because of the same reason as that of the typical aspect mentioned above (in order to prevent the resin from infiltrating into the communicating passage when forming the lid body with connector portion), the aspect is preferably structured such that one end portion of the terminal coating forming portion exposes (for example, protrudes) to an internal space of the connector portion, one opening of the communicating passage is formed in the one end portion, the other end portion of the terminal coating forming portion exposes (for example, protrudes) to a lower surface of the lid body in such a manner as to expose to an internal space of the case portion and the other opening of the communicating passage is formed in the other end portion.

Further, a stator according to the present invention includes the same feature as that of the electrically operated valve according to the present invention.

More specifically, the stator is a stator which can be disposed in an electric motor driving a valve body of an electrically operated valve, the stator has a control board on which an electronic component controlling the electric motor is mounted, a board storage portion which allows the control board to be stored in a sealed state, a connector portion having an external portion connecting terminal which performs an electrical connection to the external portion and a sealing structure which is sealed by fitting to a mating connector, and a communicating passage which allows the board storage portion and the connector portion to be communicated, and the board storage portion comes to the sealed state when the mating connector is fitted to the connector portion.

Each of the aspects mentioned in the electrically operated valve according to the present invention can be employed in the same manner in the stator according to the present invention mentioned above.

According to the present invention, it is possible to inspect the sealing performance of the board storage portion of the electrically operated valve with control board. Thus, it is possible to previously prevent any trouble caused by the poor sealing of the board storage portion from being generated, and it is possible to further improve the reliability of the electrically operated valve.

The other objects, features and advantages of the present invention are clarified by the following description of embodiments according to the present invention described on the basis of the accompanying drawings. It is apparent for a person skilled in the art that the present invention is not limited to the following embodiments, but can be variously modified within the scope of claims. Further, same reference numerals in the drawings denote the same or corresponding portions.

DESCRIPTION OF EMBODIMENTS

First Embodiment

Figure 1:
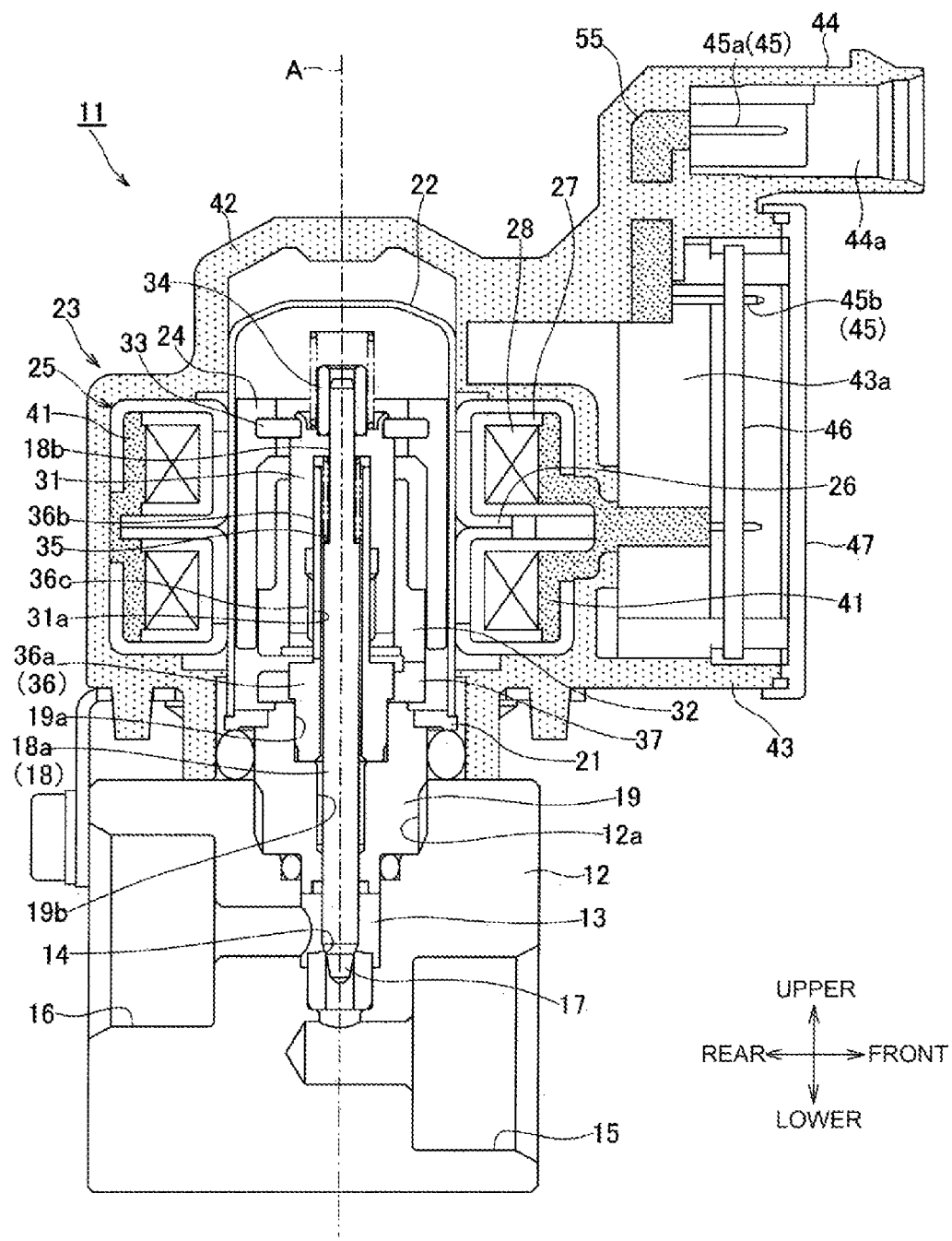
FIG. 1 is a vertical cross sectional view showing a valve close state of an electrically operated valve according to a first embodiment of the present invention.
Figure 2:
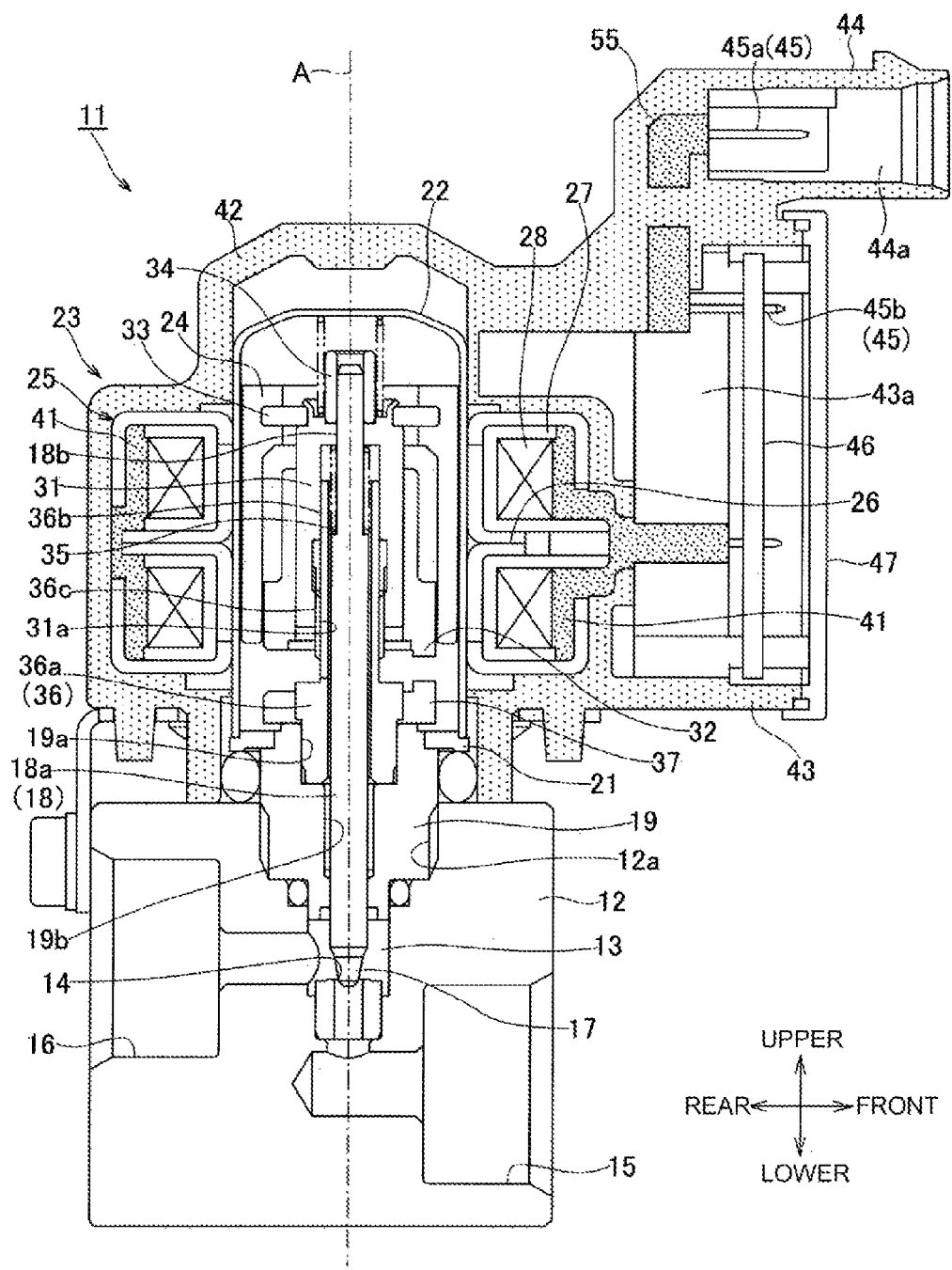
FIG. 2 is a vertical cross sectional view showing a valve open state of the electrically operated valve according to the first embodiment.
Figure 3:
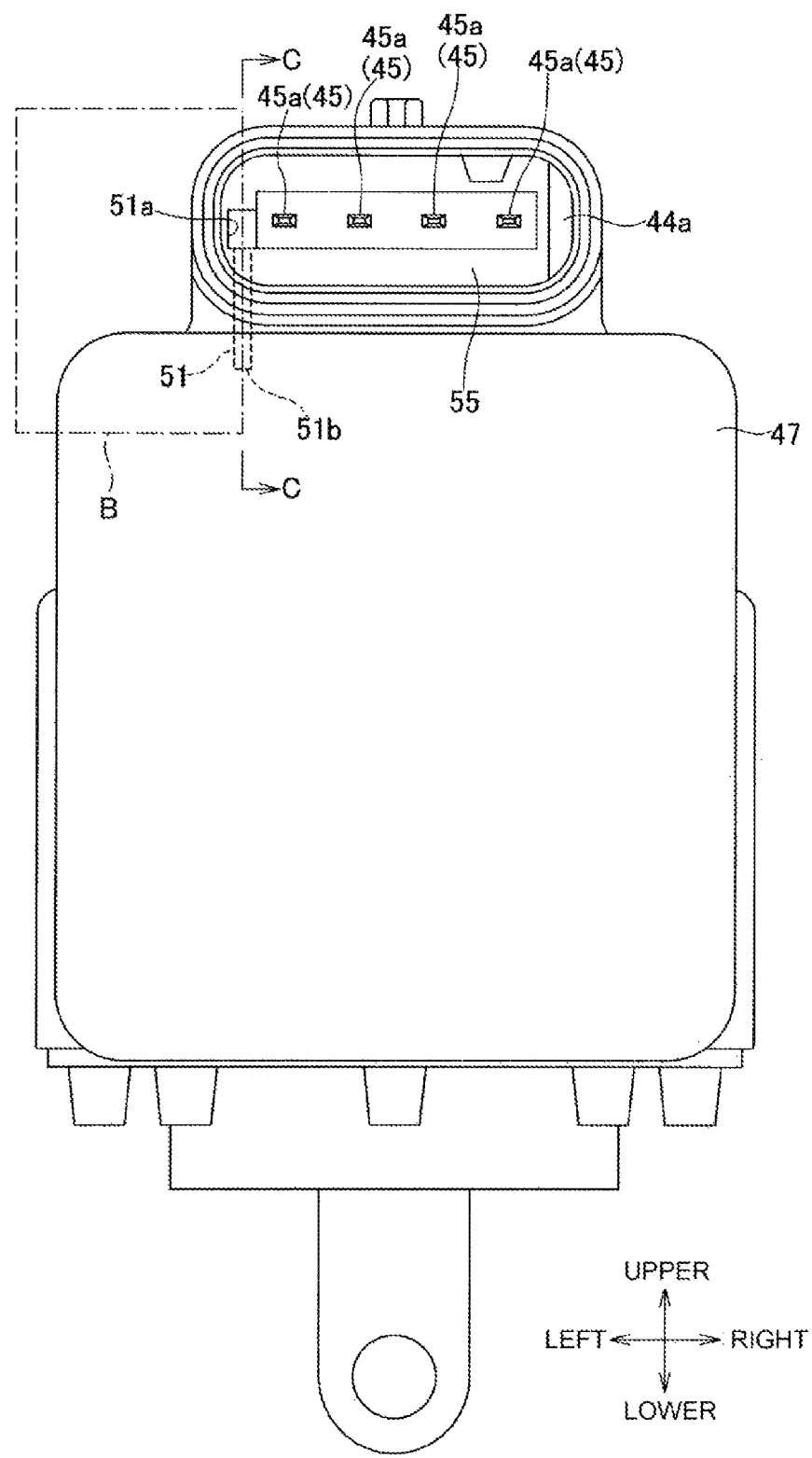
FIG. 3 is a front elevational view showing a board storage portion and a connector portion of the electrically operated valve according to the first embodiment.
Figure 4:
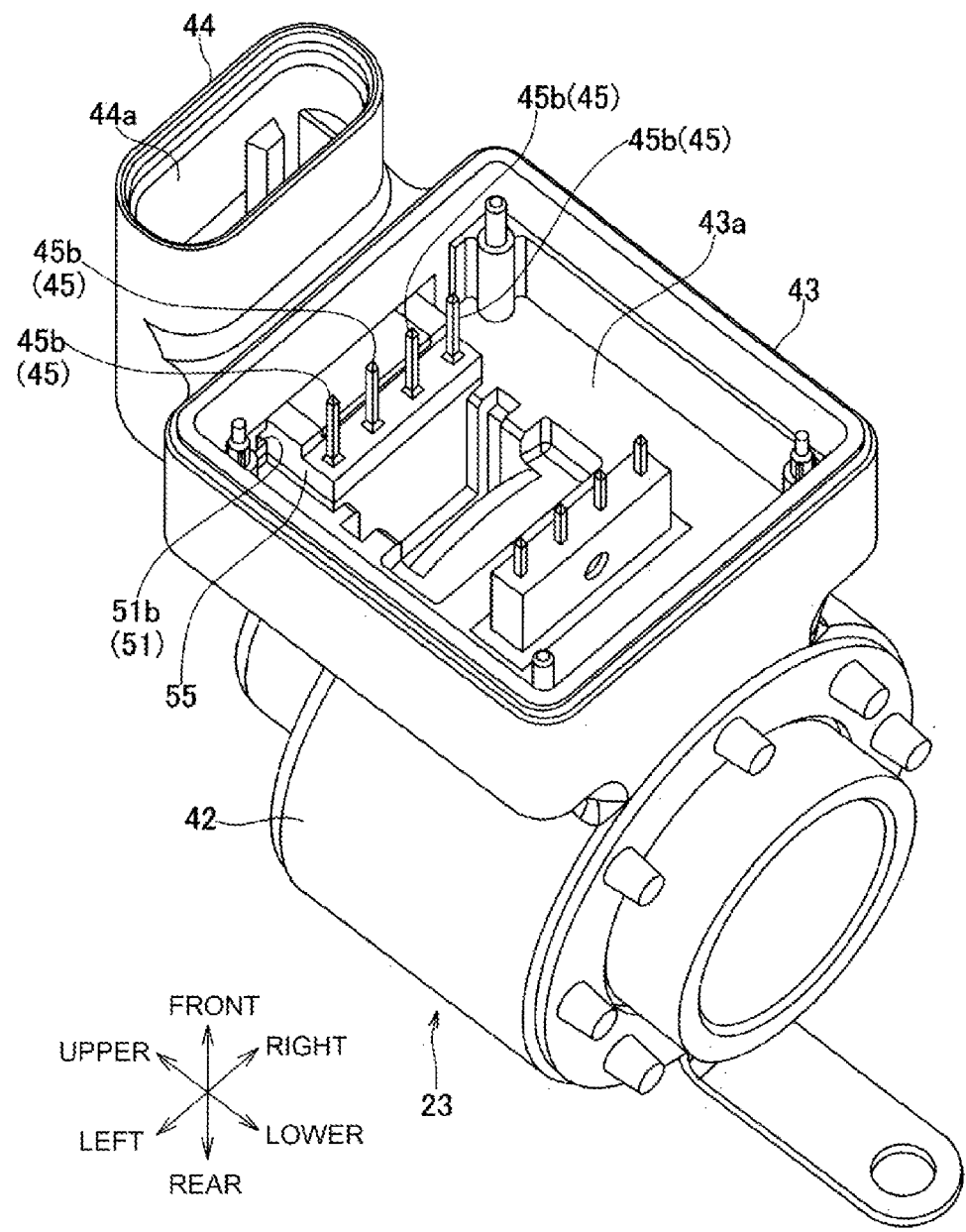
FIG. 4 is a perspective view showing the board storage portion (in a state in which a lid body is not attached) and the connector portion of the electrically operated valve according to the first embodiment.
Figure 5:
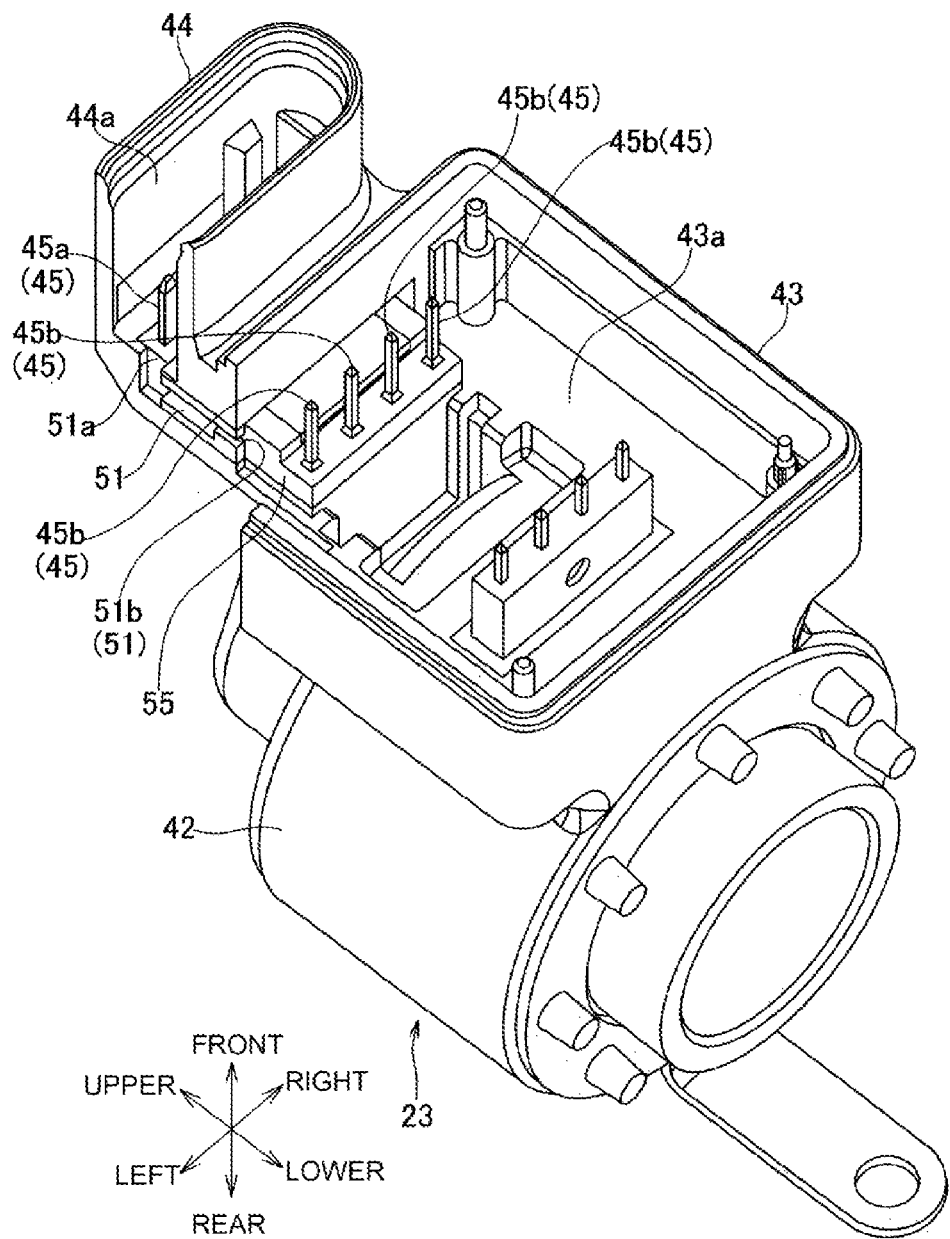
FIG. 5 is a perspective view showing the board storage portion (in a state in which the lid body is not attached) and the connector portion of the electrically operated valve according to the first embodiment by partly cutting off (reference sign B portion in FIG. 3) so that a communicating passage is visible.
Figure 6:
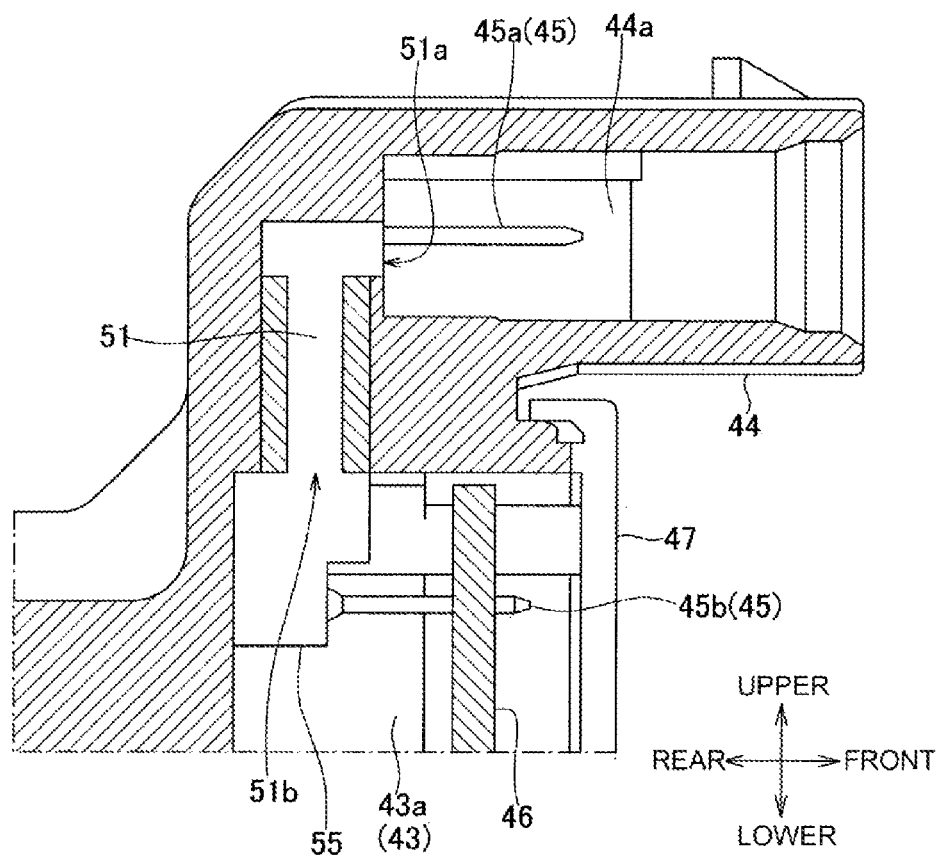
FIG. 6 is a vertical cross sectional view (cross sectional view as seen from an arrow C-C in FIG. 3) showing the communicating passage of the electrically operated valve according to the first embodiment.

As shown in FIGS. 1 to 6, an electrically operated valve 11 according to a first embodiment of the present invention is an electrically operated valve which is preferably used for regulating a flow rate of a refrigerant in a refrigeration cycle apparatus, for example, an air conditioning machine, and is provided with a valve main body 12 having a valve chamber 13 in an internal portion thereof and also having an inflow passage 16 which allows the refrigerant to flow into the valve chamber 13 and an outflow passage 15 which allows the refrigerant to flow out of the valve chamber 13, a valve seat 14 which is formed in an opening portion for the valve chamber 13 in the inflow passage 16, a valve body 17 which changes a passing quantity (flow rate) of the refrigerant by moving forward and backward (moving upward and downward) with respect to the valve seat 14 between a valve close state (refer to FIG. 1) coming into contact with the valve seat 14 and a valve open state (refer to FIG. 2) being away from the valve seat 14, an electric motor 23 which drives the valve body 17, a coupling member 19 which couples the electric motor 23 to the valve main body 12, a printed board (control board) 46 which mounts a controller (not shown) controlling the electric motor 23 thereon, a case (board storage portion/case portion) 43 which stores the board 46, a lid body 47 which occludes a front opening of the case 43, a connector 44 which has an external portion connecting terminal 45 electrically connecting to the external portion, a communication hole 51 which communicates an internal portion of the case 43 with an internal portion of the connector 44, and a can (sealed container) 22 which covers an upper opening 12a of the valve main body 12 communicating with the valve chamber 13 and forms a sealed space together with the coupling member 19.

Each of the drawings appropriately shows two-dimensional coordinates or three-dimensional coordinates which represent a longitudinal direction, a horizontal direction and a vertical direction and are orthogonal to each other, and the following description will be given on the basis of these directions. Further, in the present embodiment, the refrigerant is flowed into from the inflow passage 16 and the refrigerant is flowed out of the outflow passage 15. However, it goes without saying that the electrically operated valve 11 can be used in a case where a flowing direction of the refrigerant is an inverse direction.

The electric motor 23 is constructed by a stepping motor including a stator 25 which is arranged in an outer side of the can 22, and a magnet rotor (hereinafter, refer simply to "rotor") 24 which is arranged in an inner side of the can so as to be rotatable and slidable in a vertical direction. Further, the stator 25 includes a yoke 26, a bobbin 27 and a coil 28.

The stator 25 and the can 22 are covered by an outer shell cover (outer shell forming portion) 42 made of a synthetic resin. Further, the outer shell cover 42 is provided in an inner side thereof with a coil cover (coil coating forming portion) 41 which covers the coil 28 and is made of a synthetic resin, and a terminal cover (terminal coating forming portion) 55 which covers and supports an intermediate portion of the external portion connecting terminal 45.

The external portion connecting terminal 45 has a leading end portion 45a which protrudes toward an internal space 44a of the connector 44 and allows an electrical connection to the external portion, and a base end portion 45b which is electrically connected to the board 46. An intermediate portion corresponding to a portion between the leading end portion 45a and the base end portion 45b is covered by the terminal cover 55. Further, one end portion (end portion in a connector side) of the terminal cover 55 exposes to the internal space 44a of the connector 44, and an opening 51a in one side (connector side) of the communicating passage 51 (refer to FIGS. 3 to 6) is formed in the one end portion. On the contrary, the other end portion (end portion in a case side) of the terminal cover 55 exposes to the internal space 43a of the case 43, and an opening 51b in the other side (case side) of the communicating passage 51 is formed in the other end portion. The communicating passage 51 communicating the case internal portion 43a and the connector internal portion 44a is a through hole which has the connector side opening 51 in one end and has the case side opening 51b in the other end.

Further, each of the covers (coil cover 41, terminal cover 55 and outer shell cover 42) is formed according to an injection molding. In the order of formation, first of all, the coil cover 41 and the terminal cover 55 (fine dot patterns are respectively applied thereto in FIGS. 1 and 2) are independently formed, the coil cover 41 and the terminal cover 55 are thereafter installed within a metal mold forming the outer shell cover 42, and the outer shell cover 42 (rough dot patterns are applied in FIGS. 1 and 2) is formed in such a manner as to cover each of the covers 41 and 55. Further, when forming the outer shell cover 42, the box-shaped case 43 storing the board 46 and the connector 44 are integrally formed with the outer shell cover 42.

The resin materials constructing the coil cover 41, the terminal cover 55, the outer shell cover 42 (including the case 43 and the connector 44) and a lid body 47 mentioned later can be set by the other kind of materials. However, in order to enhance bondability between the resins, the same material is preferably used.

The case 43 is disposed in a lateral side (front side) of the stator 25, and the connector 44 is disposed in an upper surface portion of the case 43. The board 46 is stored in the internal portion 43a of the case 43 through the front opening of the case 43, and the coil 28 is electrically connected to the external portion connecting terminal 45 via the board 46. This is because of enabling power feeding from an external power supply (not shown) to the coil 28. Further, a controller including a pulse generator and a motor driving circuit is mounted to the board 46. Further, in a case where a magnetic sensor detecting rotation of the rotor 24 is provided in the electrically operated valve 11, a computing apparatus computing an angle of rotation of the rotor 24 and an opening degree of the valve on the basis of an output signal from the magnetic sensor may be mounted to the board 46.

The case 43 and the connector 44 are both constructed as a sealable structure, however, both the elements (the case 43 and the connector 44) are communicated by the communicating passage 51 as mentioned above. More specifically, the internal portion 44a of the connector 44 comes to a sealed state by fitting a mating connector (not shown) to a front end portion of the connector 44. The mating connector is a connector for achieving an electrical connection to the external portion connecting terminal 45 from the external portion, and has such a shape as to fit in a sealed state to the connector 45 of the electrically operated valve 11. The mating connector (accordingly the connector 44 of the electrically operated valve 11 fitted thereto also) has various shapes which conform to the specification of the user of the electrically operated valve 11 as mentioned above. Further, the sealed state means a state in which any moisture does not infiltrate into the internal portion 44a of the connector 44 in a normal use state of the electrically operated valve 11. In the present embodiment, the internal portion 44a of the connector 44 is cut off from the external space (atmosphere side).

In the meantime, the case 43 comes to a sealed state in which the case 43 is cut off from the outside by welding the resin lid body 47 to the front opening to close the front opening, except the structure in which the case 43 communicates with the inside 44a of the connector 44 through the communicating passage 51.

Further, the electrically operated valve 11 is provided with a rod-shaped valve stem 18 which extends in a vertical direction from an internal portion of the rotor 24 toward the valve chamber 13 along a central axis line A. The valve stem 18 has a columnar barrel portion 18a, and an upper small-diameter portion 18b which is coaxially formed in an upper end portion of the barrel portion 18a in succession to the barrel portion 18a and has a small outer diameter. Further, the valve body 17 is integrally provided in a lower end of the valve stem 18 (barrel portion 18a). The rotor 24 is arranged in an inner side of the can 22 so as to be rotatable and slidable in the vertical direction, and the valve is opened and closed by the integral movement in the vertical direction of the valve stem 18 provided with the valve body 17 in the lower end and the rotor 24.

A valve stem holder 31 is provided in an inner side of the rotor 24. The valve stem holder 31 has a cylindrical shape which is closed in an upper end, and a support ring 33 is fixed to an upper end portion of the valve stem holder 31 by a caulking. Further, the rotor 24 and the valve stem holder 31 are integrally connected via the support ring 33. A female screw portion 31a is formed on an inner peripheral surface of the valve stem holder 31. The female screw portion 31a constructs a transfer mechanism (screw feeding mechanism) which is threadably mounted on a male screw portion 36a of a guide bush 36 mentioned later and converts the rotation of the electric motor 23 into a linear motion to transfer to the valve stem 18.

The upper small-diameter portion 18b of the valve stem 18 passes through the valve stem holder 31, and a push nut 34 for retaining is attached to an upper end portion of the upper small-diameter portion 18b. The valve stem 18 is biased downward by a compression coil spring 35 which is disposed between the valve stem holder 31, and a step portion between the barrel portion 18a and the upper small-diameter portion 18b in the valve stem 18. Therefore, the valve stem 18 is regulated its relative movement in the vertical direction to the valve stem holder 31 by the push nut 34 and the compression coil spring 35, and moves upward and downward together with the valve stem holder 18.

The coupling member 19 is a tubular member having a large-diameter hole 19a and a small-diameter hole 19b which are through holes communicating with each other. The large-diameter hole 19a passes through an upper center portion of the coupling member 19, and has a large diameter so that the guide bush 36 mentioned later can be fitted and inserted from the above. The small-diameter hole 19b passes through a lower center portion of the coupling member 19 and has a small diameter. Further, the cylindrical can 22 which is covered and not bottomed (in which a bottom surface is opened and a top surface is occluded) is joined to an outer peripheral surface of the upper end portion of the coupling member 19 via a ring-shaped base plate 21.

The guide bush 36 is fixed to the large-diameter hole 19a in the upper portion of the coupling member 19. The guide bush 36 has a large-diameter cylindrical portion 36a which has a large outer diameter, and a small-diameter cylindrical portion 36b which is coaxially formed in an upper end portion of the large-diameter cylindrical portion 36a in succession to the large-diameter cylindrical portion 36a and has a small outer diameter. A male screw portion 36c threadably mounted on the female screw portion 31a of the valve stem holder 31 is formed on an outer peripheral surface of the small-diameter cylindrical portion 36b. The guide bush 36 is connected to the coupling member 19 by pressing the large-diameter cylindrical portion 36a in an inner side of the coupling member 19. Further, the barrel portion 18a of the valve stem 18 passes through the small-diameter hole 19b of the coupling member 19.

Further, an upper stopper body 32 is disposed in the valve stem holder 31, and a lower stopper body 37 is disposed in the large-diameter cylindrical portion 36a of the guide bush 36. The stopper bodies 32 and 37 are provided for determining a lower limit position of the valve stem holder 31, and when the valve stem holder 31 moves down by rotating to reach the lower limit position, the upper stopper body 32 comes into contact with the lower stopper body 37 and further rotation of the valve stem holder 31 is regulated.

The mechanism for transferring the drive force of the electric motor 23 to the valve body 17 can employ various mechanisms in addition to the above mechanism, and is not limited to the above structure.

A description will be given below of a motion of the electrically operated valve according to the present embodiment.

When an electric current is supplied to the stator 25 (coil 28) in such a manner that the rotor 24 turns in one direction from the valve close state shown in FIG. 1, the valve stem holder 31 connected to the rotor 24 turns together with the rotor 24. Since the female screw portion 31a threadably mounted on the male screw portion 36c formed on the outer peripheral surface of the small-diameter cylindrical portion 36b of the guide bush 36 is formed on the inner peripheral surface of the valve stem holder 31, the rotation of the rotor 24 (valve stem holder 31) is converted into the liner motion in the vertical direction on the basis of an interaction of the male screw portion 36c and the female screw portion 31a, and the valve stem holder 31 moves upward. As a result, the rotor 24 connected to the valve stem holder 31, and the valve stem 18 regulating its relative movement to the valve stem holder 31 also move upward together with the valve stem holder 31. The valve body 17 disposed in the lower end of the valve stem 18 is away from the valve seat 14 accompanied with the upward movement of the valve stem 18, so that the refrigerant flowing into from the inflow passage 16 is going to flow out of the outflow passage 15 through the valve chamber 13 (refer to FIG. 2). A passing quantity (refrigerant flow rate) of the refrigerant can be adjusted on the basis of an amount of rotation of the rotor 24.

On the contrary, when the electric current is supplied to the stator 25 (coil 28) in such a manner that the rotor 24 turns in a direction opposite to the one direction from the valve open state, the rotation of the rotor 24 (valve stem holder 31) is converted into the linear motion in the vertical direction on the basis of the interaction of the female screw portion 31a and the male screw portion 36c. As a result, the valve stem holder 31 moves downward together with the rotor 24 and the valve stem 18. Thus, the valve body 17 moves downward toward the valve seat 14, and a flow passage between the inflow passage 16 and the outflow passage 15 is cut off when the valve body 17 comes into contact with the valve seat 14, thereby coming to the valve close state (refer to FIG. 1).

In the electrically operated valve 11 according to the present embodiment, the communicating passage 51 is disposed between the connector 44 and the case 43. Therefore, the airtightness inspection of the case 43 can be performed in a completed state in which the board 46 is stored in the case 43 and the lid body 47 closing the front opening is welded to the case 43. The inspection can be performed, for example, by pressing the gas (air or inert gas) in the case internal portion 43a at a fixed pressure from the connector 44 via the communicating passage 51 so as to set the case internal portion 43a in a high-pressure state, and monitoring a change in the gas pressure. The reduction of the gas pressure means leakage of the gas. Thus, existence of poor sealing can be found. On the contrary, if the gas pressure is kept constant, it is possible to find that the product is a normal product having no poor sealing.

Second Embodiment

A description will be given of an electrically operated valve according to a second embodiment of the present invention with reference to FIGS. 7 to 8. In the following description, same reference numerals are attached to the same structures as those of the electrically operated valve 11 according to the first embodiment, a redundant description will be omitted, and the description will be given mainly of different points.

Figure 7:
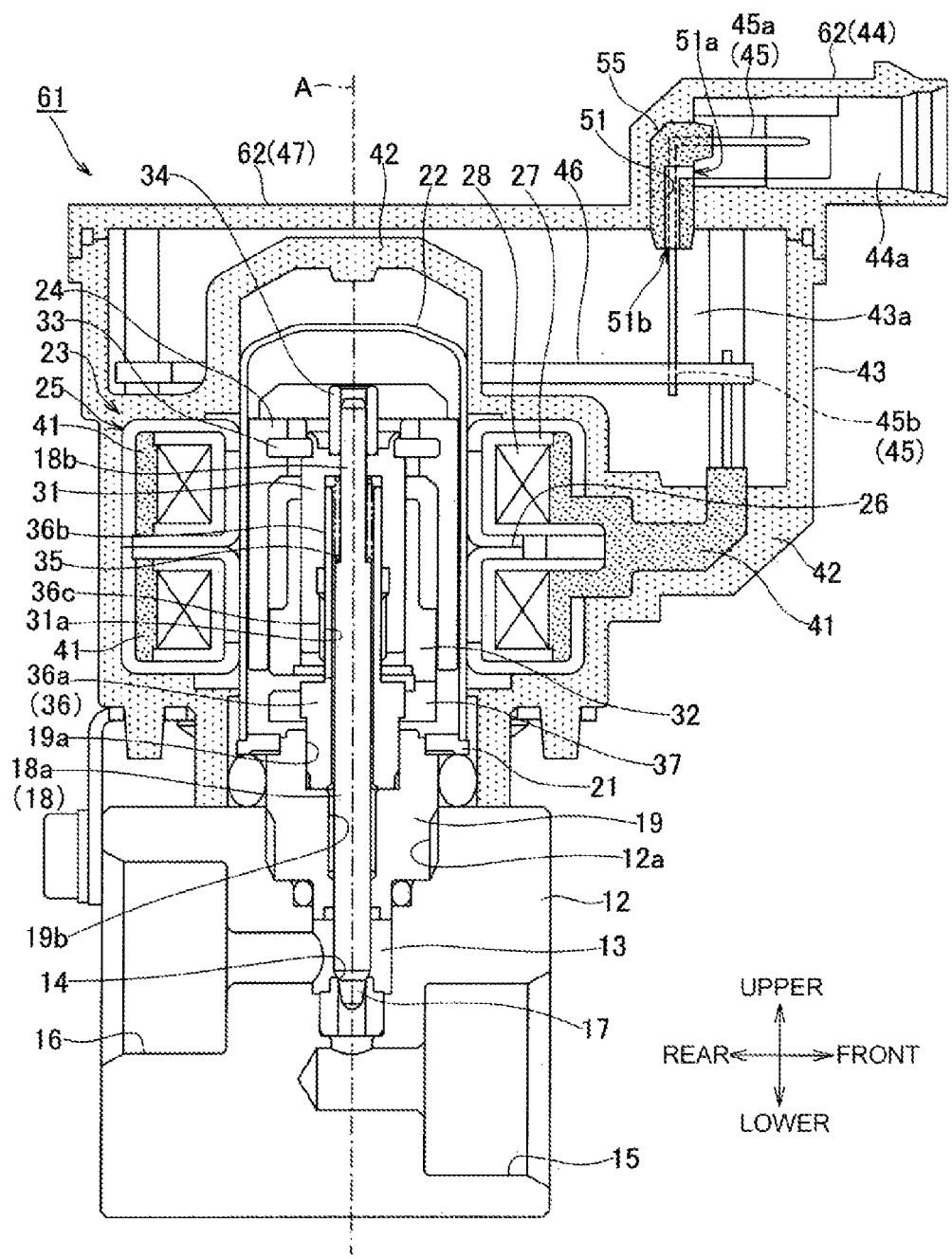
FIG. 7 is a vertical cross sectional view showing a valve close state of an electrically operated valve according to a second embodiment of the present invention.
Figure 8:
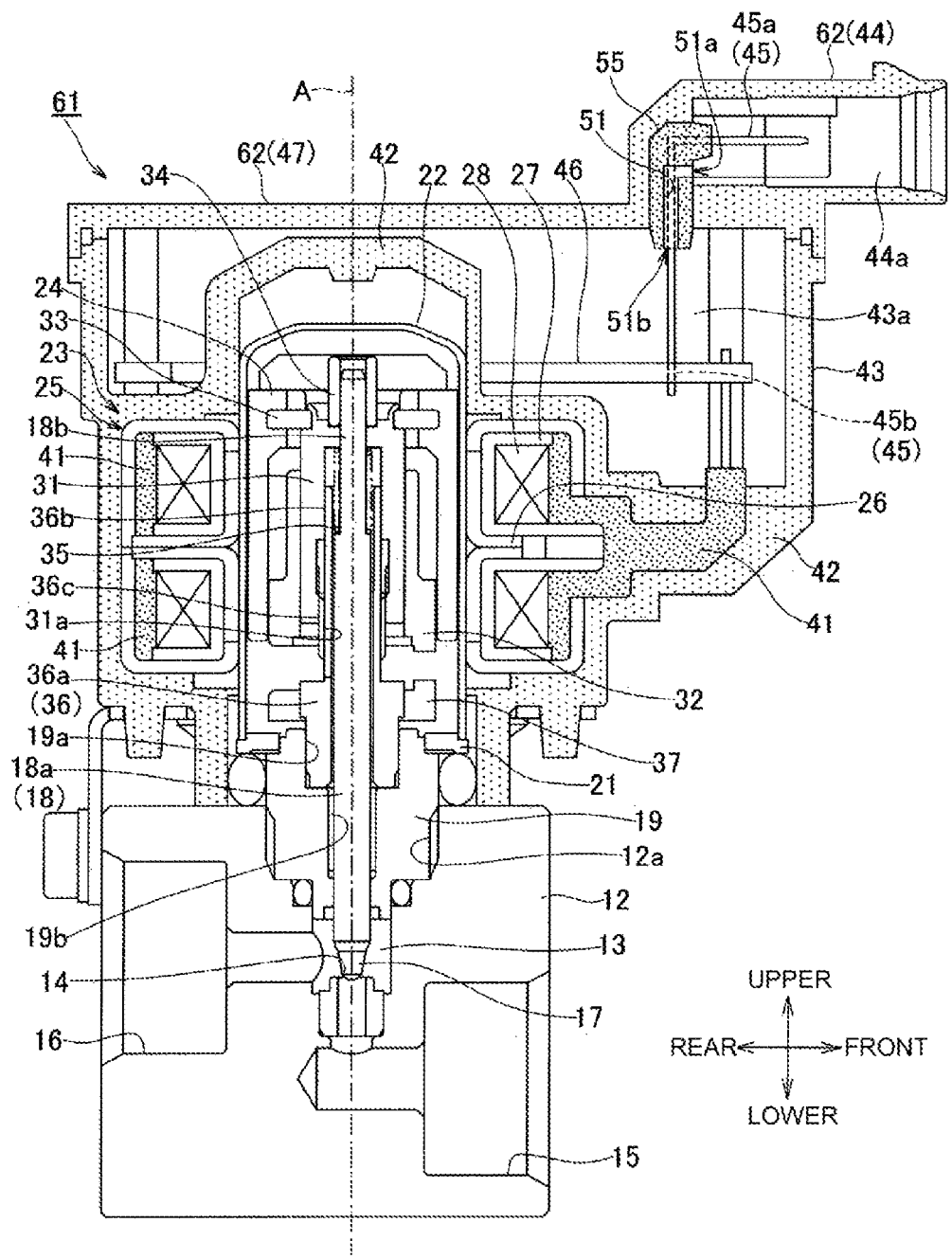
FIG. 8 is a vertical cross sectional view showing a valve open state of the electrically operated valve according to the second embodiment.

As shown in FIGS. 7 to 8, an electrically operated valve 61 according to the present embodiment is adapted to move the valve body 17 upward and downward by the electric motor (stepping motor) 23 to regulate the flow rate of the refrigerant in the same manner as the electrically operated valve 11 according to the first embodiment, and is provided with the board 46 which controls the electric motor 23. However, the board 46 is arranged in the upper surface portion of the electric motor 23 (stator 25) so as to horizontally extend, and the case 43 storing the board 46 is formed in the upper surface portion of the electric motor 23.

The present embodiment is provided with the outer shell cover 42 (to which a rough dot pattern is applied in FIGS. 7 and 8) which covers the stator 25 of the electric motor 23 and the can 22, and the coil cover 41 (to which a fine dot pattern is applied in FIGS. 7 and 8) which is arranged in the inner side of the outer shell cover 42 and covers the coil 28 in the same manner as the electrically operated valve 11 according to the first embodiment. However, as is different from the electrically operated valve 11 according to the first embodiment, the connector 44 is not integrally formed with the outer shell cover 42, but is formed as a lid body 62 with connector in a different step and is integrally formed with the lid body 47 which occludes the upper opening of the case 43.

The lid body 62 with connector is manufactured via two stages of forming steps. First of all, a first step forms the terminal cover (terminal coating molded portion) 55 which covers and supports the intermediate portion of the external portion connecting terminal 45 and is made of resin, and a successive second step integrally forms the connector 44 and the lid body 47 as the lid body 62 with connector in such a manner that the terminal cover 55 covers the terminal cover 55 and is supported between the connector 44 and the lid body 47, in other words, such that the terminal cover 55 passes through a boundary portion between the connector 44 and the lid body 47, further in other words, such that one end portion of the terminal cover 55 protrudes to the connector internal portion 44a and the other end portion of the terminal cover 55 protrudes downward from the lower surface of the lid body 47.

Further, in the present embodiment, the communicating passage 51 is formed in the terminal cover 55 in the first step of forming the terminal cover 55. The communicating passage 51 is a through hole which communicates the connector internal portion 44a with the case internal portion 43a in the same manner as the first embodiment, has the connector side opening 51a in one end portion of the terminal cover 55, and has the case side opening 51b in the other end portion.

In the second step mentioned above, the connector side opening 51a is positioned within the internal space 44a of the connector 44 due to the protrusion of the end portion in the connector side of the terminal cover 55 into the internal space 44a of the connector 44, and the case side opening 51b is positioned below the lower surface of the lid body 47 due to the protrusion of the end portion in the lid body side from the lower surface of the lid body 47. Therefore, it is possible to prevent the communicating passage 51 (connector side opening 51a and case side opening 51b) from being closed due to the infiltration of the resin forming the outer shell cover 42 when forming the outer shell cover 42 (in the second step) into the communicating passage 51 from the connector side opening 51a and the case side opening 51b.

The lid body 62 with connector is welded to the upper edge portion of the case 43 in such a manner as to occlude the upper opening of the case 43 after installing the board 46 in the case internal portion 43a. The electrical connection between the external portion connecting terminal 45 and the board 46 may be achieved by a press fit connection. More specifically, with the use of the base end portion (end portion in the board side) 45b of the eternal portion connecting terminal 45 and a press fit pin, the press fit pin is adapted to be pressed in a through hole of the board 46 when putting the lid body 62 with connector on the upper surface of the case 43.

In the present embodiment, the case internal portion 43a and the connector internal portion 44a come to a communicated state by the communicating hole 51 which passes through the terminal cover 55. Therefore, in the same manner as the first embodiment, it is possible to fine the poor sealing by pressing the gas for inspection in the case internal portion 43a from the connector 44 via the communicating passage 51 and monitoring the pressure change.

The invention claimed is:

1. An electrically operated valve comprising:
a valve main body having a valve chamber communicated with an inflow passage introducing a refrigerant and an outflow passage discharging the refrigerant;
a valve body for changing a flow rate of the refrigerant by moving forward and backward with respect to a valve seat formed within the valve chamber between a valve close state seating on the valve seat and a valve open state separating from the valve seat;
an electric motor for driving the valve body;
a control board mounted with electronic components controlling the electric motor;
a board storage portion for making it possible the control board to be stored in a sealed state; and
a connector portion having an external connection terminal for an electrical connection to the outside and a sealing structure sealed by fitting to a mating connector,
wherein the electrically operated valve further comprises:
a communicating passage for communicating the board storage portion with the connector portion; and
a terminal coating molded portion formed in an inner side of the connector portion covers and supports an intermediate portion of an external connecting terminal,
the communicating passage is formed in the terminal coating molded portion,
wherein the board storage portion includes:
a case portion having an opening for making them possible the control board to be stored in an internal portion thereof and the board to be installed in the internal portion thereof; and
a lid body for occluding the opening, and
wherein the board storage portion comes to the sealed state when the mating connector is fitted to the connector portion.

2. The electrically operated valve according to claim 1, wherein one end portion of the terminal coating molded portion exposes to an internal space of the connector portion, and one opening of the communicating passage is formed in the one end portion, and
wherein the other end portion of the terminal coating molded portion exposes to an internal space of the case portion and the other opening of the communicating passage is formed in the other end portion.

3. The electrically operated valve according to claim 1, further comprising an outer shell molded portion covering a stator of the electric motor,
wherein the outer shell molded portion and the case portion are integrally formed.

4. The electrically operated valve according to claim 3, wherein coil coating molded portion covering coil included in the stator is disposed in an inner side of the outer shell forming portion.

5. The electrically operated valve according to claim 3, wherein the outer shell molded portion, the case portion and the connector portion are integrally formed.

6. An electrically operated valve comprising:
a valve main body having a valve chamber communicated with an inflow passage introducing a refrigerant and an outflow passage discharging the refrigerant;
a valve body for changing a flow rate of the refrigerant by moving forward and backward with respect to a valve seat formed within the valve chamber between a valve close state seating on the valve seat and a valve open state separating from the valve seat;
an electric motor for driving the valve body;
a control board mounted with electronic components controlling the electric motor;
a board storage portion for making it possible the control board to be stored in a sealed state; and
a connector portion having an external connection terminal for an electrical connection to the outside and a sealing structure sealed by fitting to a mating connector,
wherein the board storage portion includes:
a case portion having an opening for making them possible the control board to be stored in an internal portion thereof and the board to be installed in the internal portion thereof; and
a lid body for occluding the opening,
wherein the connector and the lid body are integrally formed as a lid body with connector portion,
wherein the electrically operated valve comprises:
a communicating passage for making it possible the board storage portion and the connector portion to be communicated;
a terminal coating molded portion which is formed in an inner side of the lid body with connector portion, and covers and supports an intermediate portion of an external portion connecting terminal,
wherein the communicating passage is formed in the terminal coating molded portion, and
wherein the board storage portion comes to the sealed state when the mating connector is fitted to the connector portion.

7. The electrically operated valve according to claim 6, wherein one end portion of the terminal coating molded portion exposes to an internal space of the connector portion, and one opening of the communicating passage is formed in the one end portion, and
wherein the other end portion of the terminal coating molded portion exposes to a lower surface of the lid body in such a manner as to expose to an internal space of the case portion, and the other opening of the communicating passage is formed in the other end portion.

8. The electrically operated valve according to claim 6, further comprising an outer shell molded portion covering a stator of the electric motor,
wherein the outer shell molded portion and the case portion are integrally formed.

9. The electrically operated valve according to claim 8, wherein the outer shell molded portion, the case portion and the connector portion are integrally formed.

* * * * *